United States Patent [19]
Cranfield et al.

[11] Patent Number: 4,551,499
[45] Date of Patent: Nov. 5, 1985

[54] POLYMERIC DIELECTRICS

[75] Inventors: Brian A. Cranfield, Southgate; John C. Fothergill, Harlow; Susan V. Wolfe, Ware, all of Great Britain

[73] Assignee: International Standard Electric Corporation, New York, N.Y.

[21] Appl. No.: 639,666

[22] Filed: Aug. 8, 1984

[30] Foreign Application Priority Data

Aug. 9, 1983 [GB] United Kingdom ............... 8321390

[51] Int. Cl.[4] ............................................. C08K 5/01
[52] U.S. Cl. ................................... 524/487; 524/583; 524/584; 524/585; 524/586
[58] Field of Search ............... 524/487, 451, 448, 493, 524/584, 586

[56] References Cited

U.S. PATENT DOCUMENTS

| 3,028,355 | 4/1962 | Toy et al. | 524/586 |
| 3,257,366 | 6/1966 | Monroe et al. | 524/584 |
| 3,293,206 | 12/1966 | Horne | 524/586 |
| 3,503,922 | 3/1970 | Carton | 524/493 |
| 3,773,741 | 11/1973 | Berta | 524/584 |
| 4,255,303 | 3/1981 | Keogh | 524/451 |

FOREIGN PATENT DOCUMENTS

| 0060178 | 9/1982 | European Pat. Off. | 524/451 |
| 57-57738 | 4/1982 | Japan | 524/586 |

Primary Examiner—Lewis T. Jacobs
Attorney, Agent, or Firm—James B. Raden

[57] ABSTRACT

A nucleating agent comprising either a substantially non-polar wax or an inert inorganic finely divided powder is incorporated in a thermoplastics polymer, e.g. polyethylene. Thus reduces the spherulite size of the material and thus increases its breakdown field strength.

3 Claims, 3 Drawing Figures

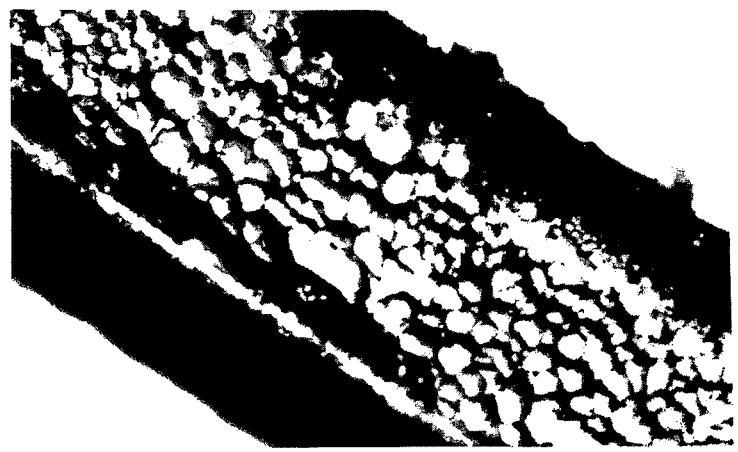
Fig. 2b. CERESIN NUCLEATED XLPE  180X
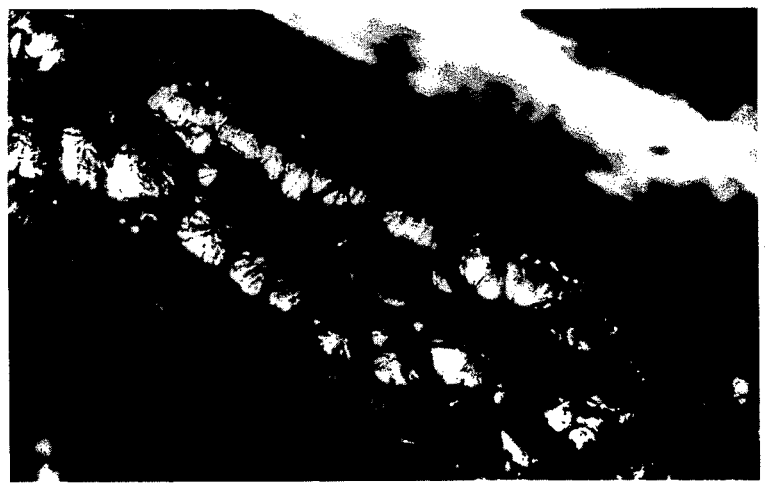
Fig. 2a. NORMAL UNNUCLEATED XLPE  180X

POLYMERIC DIELECTRICS

BACKGROUND OF THE INVENTION

This invention relates to polymeric dielectrics and in particular to techniques for improving the electrical breakdown strength of such dielectrics.

Polymeric materials are widely used as insulators under high voltage stress conditions. Typical applications include power cables and high voltage bushings. In the design of such structures due allowance must be made for the electrical breakdown strength of the polymeric material.

The bulk electrical breakdown field strength of a polymeric material depends both on the nature of the material and, in many cases, on the thermal and mechanical treatment of the material prior to use. For example, where the polymer is to be applied to a cable by extrusion, the mechanical and thermal stress involved can have a significant effect on spherulite size.

The number of factors can affect the breakdown field strength of a material. For thermoplastics such as polyethylene and polypropylene an important factor is the crystal structure of the material. Such materials comprise spherulites which are substantially spherical radiating arrays of crystallites. These spherulites are typically of 40 to 60 microns in diameter and compose the entire structure of the polymer. They may be thought of as analogous to grains in metal with spherulite size being analogous to grain size. The way in which these spherulites affect the breakdown strength is not fully understood, but it has become apparent that a large average spherulite diameter has an adverse effect on the breakdown field strength.

SUMMARY OF THE INVENTION

The object of the present invention is to improve the electrical properties of a polymer dielectric by controlling the spherulite size.

According to the invention there is provided a thermoplastics polymer having incorporating therein a nucleating agent whereby the average polymer spherulite size is reduced.

We have found that the incorporation of small quantities of a nucleating agent in a polymer such as polyethylene or polypropylene results in a significant reduction both in the average spherulite diameter and in the deviation from the average diameter. This has been found to provide an increase in the breakdown field strength and a decrease in the standard description of the field strength from the mean value.

BRIEF DESCRIPTION OF THE DRAWING

An embodiment of the invention will now be described with reference to the accompanying drawings, in which:

and FIGS. 2a and 2b are microscopic sections illustrating the spherulite structure of an untreated polyethylene (FIG. 2a) and of a polyethylene containing a nucleating agent. (FIG. 2b).

DETAILED DESCRIPTION OF THE INVENTION

Figure 1:
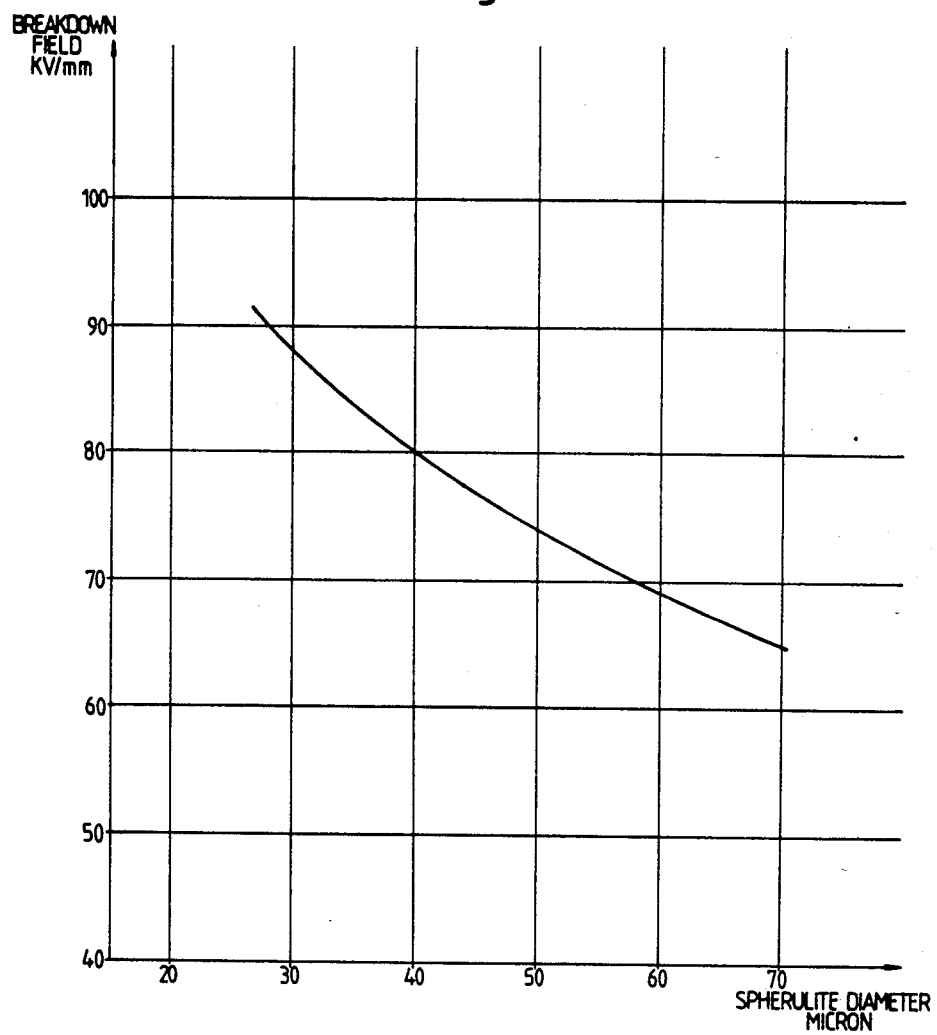
FIG. 1 illustrates the relationship between breakdown field strength and spherulite diameter for polyethylene.

We have improved the breakdown strength of polymers such as polyethylene or polypropylene by the incorporation therein of from about 0.01 to 5 weight percent, preferably about 0.05 to 2 weight percent, of a nucleating agent comprising a substantially non-polar wax. We prefer to employ ceresin wax for this purpose but other natural and synthetic wax compositions can also be employed. We have also successfully employed finely divided inert inorganic materials as a nucleating agent. The average diameter of such a powder should be below about 1 micron and suitable materials include, but are in no way limited to, talc, fumed silica or diatomaceous silica.

A typical untreated polyethylene can have an average spherulite diameter greater than 40 microns, and in some cases as much as 70 microns. Using a nucleating agent as described herein this average spherulite size is reduced typically to 25 to 30 microns with a corresponding increase in breakdown field strength. The relationship between spherulite diameter and field strength is illustrated in FIG. 1 of the accompanying drawings. As can be seen, whereas a untreated polyethylene having a spherulite diameter of 40 microns has a breakdown strength of 80 kv/mm, the corresponding typical figures for a polyethylene treated with a nucleating agent are 30 microns and 88 kv/mm. Where the spherulite diameter has been reduced to 25 microns, we have measured a breakdown field strength in the range of about 89-95 kv/mm. In regard to above noted breakdown voltage figures, it should be recognized that such voltages are difficult to measure exactly and can vary from sample to sample. Thus, the cited figures for the breakdown voltages voltages should be considered to be typical measurements indicating a medium value. The cited figures clearly demonstrate the increase in breakdown field strength resulting from the reduction in average spherulite size caused by the inclusion of the nucleating agent in the polymer.

The effect of reduction of spherulite size is also shown in FIGS. 2a and 2b which show a polyethylene respectively before and after treatment with 0.1 weight percent of ceresin wax.

All voltage breakdown measurements have been carried out using the method described in British Standard No. 2782, Method 201.

The nucleating agent may be incorporated in the polymeric material using a master batch technique. A measured quantity of the nucleating agent is mixed with a measured quantity of the polymer which in turn is mixed with a larger quantity of untreated polymeric material. Where an inorganic material is used, a dispersing agent is required to prevent flocculation. Thorough mixing of polymer and nucleating agent is effected when the material is subjected to extrusion of injection molding.

The nucleated material can be used in a variety of applications but it is particularly suitable in the manufacture of power cables, wire products and high voltage bushings.

What is claimed is:

1. A thermoplastic polymer dielectric selected from the group consisting of polyethylene and polypropylene and having incorporated therein a nucleating agent, said nucleating agent comprising ceresin wax having an average particulate diameter of less than one micron, said nucleating agent being incorporated in an amount of about 0.01–5 weight percent whereby the average polymer spherulite size is reduced and the breakdown field strength of the polymer is increased.

2. The polymer dielectric of claim 1 wherein the average spherulite diameter is in a range of about 25-30 microns.

3. An electrical cable or wire product utilizing the polymer dielectric of claim 1.

* * * * *